US011456958B1

(12) United States Patent
Li et al.

(10) Patent No.: US 11,456,958 B1
(45) Date of Patent: Sep. 27, 2022

(54) METHOD AND SYSTEM FOR METER CONFORMANCE IN A SWITCH

(71) Applicant: Hewlett Packard Enterprise Development LP, Houston, TX (US)

(72) Inventors: Shen Li, Roseville, CA (US); Kevin M. Worth, Roseville, CA (US); Christian Elton Cleveland, Roseville, CA (US); Matthew Lee Deter, Rocklin, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/226,794

(22) Filed: Apr. 9, 2021

(51) Int. Cl.
*H04L 47/20* (2022.01)
*H04L 47/2441* (2022.01)
*H04L 47/215* (2022.01)

(52) U.S. Cl.
CPC .......... *H04L 47/20* (2013.01); *H04L 47/215* (2013.01); *H04L 47/2441* (2013.01)

(58) Field of Classification Search
CPC ....... H04L 47/00; H04L 47/20; H04L 47/215; H04L 47/2441; H04L 49/503
See application file for complete search history.

(56) References Cited

U.S. PATENT DOCUMENTS

| 8,000,244 | B1* | 8/2011 | Canion | H04L 47/2441 370/235 |
| 2008/0095053 | A1* | 4/2008 | Chen | H04L 47/10 370/230.1 |
| 2012/0170452 | A1* | 7/2012 | Alleyne | H04L 47/31 370/230 |
| 2015/0271079 | A1* | 9/2015 | Huang | H04W 24/08 370/230.1 |

OTHER PUBLICATIONS

Cisco, "Understanding the Definition of bits per second (bits/sec) from the show interfaces Command Output", available online at <https://www.cisco.com/c/en/us/support/docs/ios-nx-os-software/ios-software-releases-110/12816-3.html>, Aug. 1, 2006, 2 pages.

* cited by examiner

*Primary Examiner* — Mohamed A Kamara
(74) *Attorney, Agent, or Firm* — Park, Vaughan, Fleming & Dowler LLP

(57) ABSTRACT

A system for facilitating data transmission in a switch is provided. During operation, the system can obtain one or more sets of configuration parameters for a plurality of traffic policing filters of the switch. A respective traffic policing filter can correspond to a token bucket. A number of tokens in the token bucket can indicate whether to forward a packet associated with the traffic policing filter. The system can determine the token allocation frequencies for the plurality of traffic policing filters based on the one or more sets of configuration parameters. The system can then select a sampling interval from the token allocation frequencies based on a selection policy and determine a performance rate for the plurality of traffic policing filters based on the sampling interval.

22 Claims, 12 Drawing Sheets

METHOD AND SYSTEM FOR METER CONFORMANCE IN A SWITCH

BACKGROUND

Field

The present disclosure relates to communication networks. More specifically, the present disclosure relates to a method and system for determining conformance with the meters associated with classifier policies in a switch.

BRIEF DESCRIPTION OF THE FIGURES

In the figures, like reference numerals refer to the same figure elements.

DETAILED DESCRIPTION

Figure 1A:
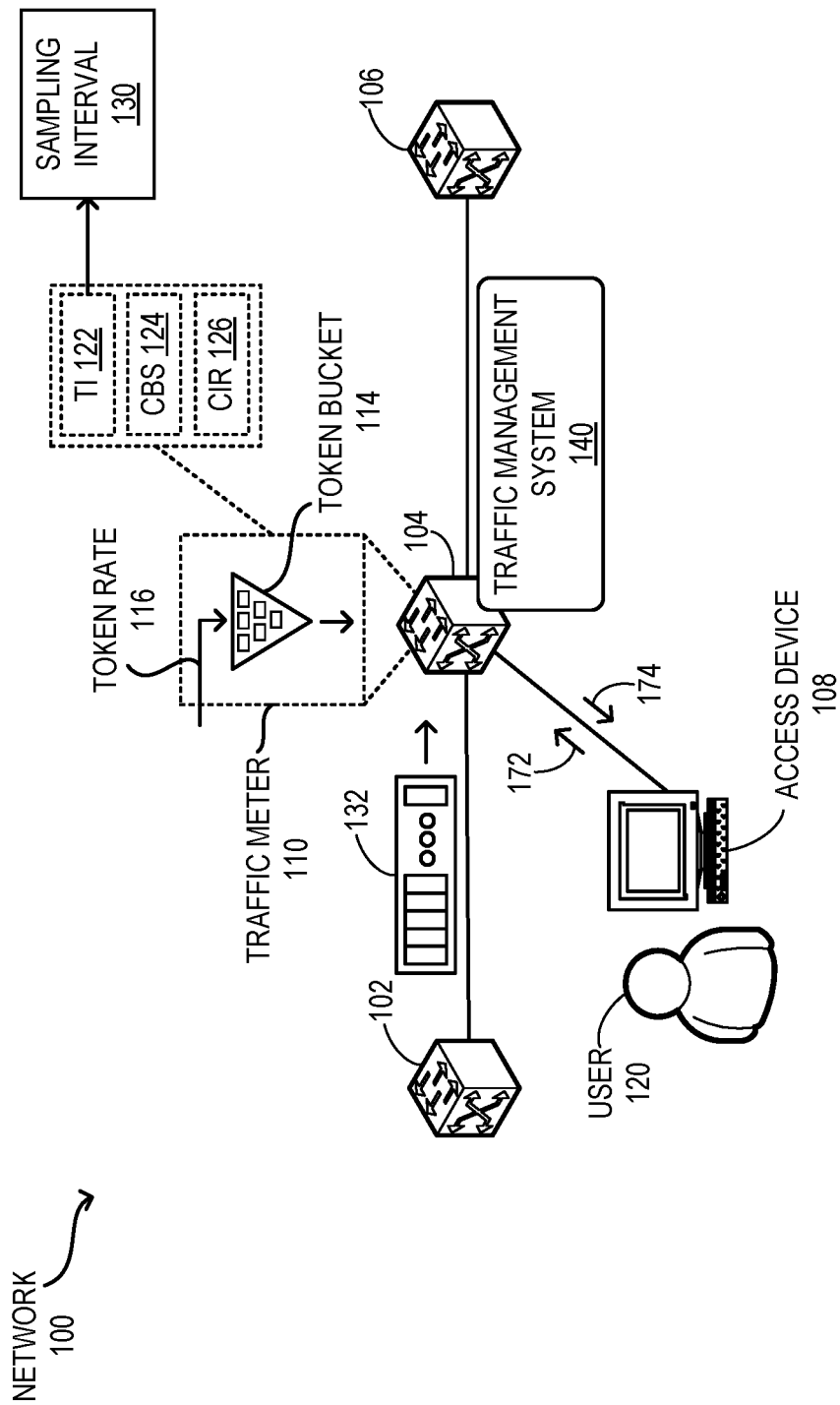
FIG. 1A illustrates an exemplary network facilitating efficient meter conformance in a switch, in accordance with an embodiment of the present application.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

Internet is the delivery medium for a variety of applications running on physical and virtual devices. Such applications have brought with them an increasing demand for traffic. As a result, equipment vendors race to build switches that can efficiently forward different classes of traffic. To do so, a switch may facilitate traffic policing to protect the network from traffic overflow or unmanaged bursty traffic. A network administrator may manage a set of rate-limiting parameters to ensure traffic transmission within the parameters. For each class of traffic, the network administrator may configure a meter (or policier) a classifier policy indicating the corresponding limit parameters. The switch may forward a packet if the packet conforms to the meter of the classifier policy. In this way, the parameters can operate as traffic meters and facilitate flow control for the switch.

However, the network administrator may need to monitor bandwidth usage to determine how well the classifier policies are managing the traffic from the switch. To aid the network administrator to monitor the bandwidth usage, the switch can report the rate of data transmission over a sample period for a respective classifier policy. Due to the variation of the rate limit parameters and sample periods, the traditional rate reporting can be inaccurate, slow to reflect the changes in traffic, or may require significant computational overhead (e.g., due to intensive usage of the switch hardware). While the classifier policies can bring many desirable features to traffic management, some issues remain unsolved regarding the reporting of meter conformance in the switch.

One embodiment of the present technology provides a system for facilitating data transmission in a switch. During operation, the system can obtain one or more sets of configuration parameters for a plurality of traffic policing filters of the switch. A respective traffic policing filter can correspond to a token bucket. A number of tokens in the token bucket can indicate whether to forward a packet associated with the traffic policing filter. The system can determine the token allocation frequencies for the plurality of traffic policing filters based on the one or more sets of configuration parameters. The system can then select a sampling interval from the token allocation frequencies based on a selection policy and determine a performance rate for the plurality of traffic policing filters based on the sampling interval.

In a variation on this embodiment, a respective of the one or more sets of configuration parameters includes an information rate and a burst size of a token bucket.

In a variation on this embodiment, the performance rate can include a conform rate for the plurality of traffic policing filters. The system can then determine the conform rate by obtaining a plurality of traffic data points from the forwarding hardware of the switch and calculating the conform rate based on a difference among the plurality of traffic data points and the sampling interval.

In a further variation, the system can issue a query to the forwarding hardware and obtain a traffic data point as a response to the query.

In a further variation, the system can obtain a request for the conform rate. A first traffic data point can be obtained at the time of the request. A second traffic data point can be obtained at the sampling interval.

In a further variation, the number of the plurality of traffic data points can be two.

In a further variation, a respective traffic data point is a cumulative data unit counts of an interface associated with the plurality of traffic policing filters.

In a variation on this embodiment, the selection policy can include selection based on one or more of: a largest token allocation frequency, a smallest token allocation frequency, a mean value of the token allocation frequencies, a median value of the token allocation frequencies, and a weighted average of the token allocation frequencies.

In a variation on this embodiment, the system can be configured with a plurality of classifier policies. Furthermore, the sampling interval can be associated with a first classifier policy. The system can then select a second sampling interval from token allocation frequencies of one or more traffic policing filters of a second classifier policy.

In a variation on this embodiment, if the sampling interval is less than a low watermark, the system can denote the low watermark as the sampling interval. On the other hand, if the sampling interval is greater than a high watermark, the system can denote the high watermark as the sampling interval.

In a variation on this embodiment, the plurality of traffic policing filters can include a hierarchical serial traffic policy filter associated with a plurality of token buckets. A representative time interval of the hierarchical serial traffic policy filter for determining the sampling interval can then correspond to a summation of time intervals associated with the plurality of token buckets.

In a variation on this embodiment, the plurality of traffic policing filters can include a hierarchical parallel traffic policy filter associated with a plurality of token buckets. A representative time interval of the hierarchical serial traffic policy filter for determining the sampling interval can then correspond to a largest time interval associated with the plurality of token buckets The embodiments described herein solve the problem of determining the conformance of the classifier policies of a switch is solved by (i) determining a corresponding time interval based on the rate-limiting parameters associated with a respective classifier policy; and (ii) determining a performance rate based on a sampling interval derived from the time intervals. Examples of the performance rate can include, but are not limited to, a conform rate, an exceed rate, and a violation rate. For example, the conform rate can indicate how well the rate-limiting parameters are metering the traffic from the switch. By determining the performance rate based on the sampling interval, the switch can efficiently provide the performance rate to an administrator.

A traffic management system of the switch can use a number of classifier policies for managing traffic flow. A classifier policy can facilitate one or more traffic meters (or traffic policiers) that can manage the maximum rate of traffic flow based on a token bucket (or bucket). Based on the token bucket, the system can determine whether the traffic associated with a meter has conformed to defined limits on bandwidth and burstiness (a measure of variations in the traffic). The system can measure the traffic based on a data unit (e.g., a predetermined number of bytes or packets). The system can periodically allocate a token to the token bucket. The rate at which the system allocates tokens can indicate an average data rate for the meter. Moreover, the depth or size of the token bucket (i.e., the number of tokens the token bucket can accommodate) can indicate the burstiness of traffic.

The token bucket can be associated with three parameters: a mean rate or information rate, a burst size, and a time interval. The information rate can be determined as (burst size/time interval) and indicate how much data that can be forwarded per unit of time on average (e.g., the average data rate). The burst size can indicate the number of data units, such as bits or bytes, per burst (e.g., the amount of traffic that can be sent per unit of time). The time interval can indicate the duration or time quantum per burst. The system can allocate tokens based on a token generation rate. Typically, the system can allocate burst size number of tokens for every time interval. If a token arrives when the bucket is full, the system can discard the token.

When a packet of n units, such as bytes, arrives, if at least n tokens are in the bucket, the system can remove n tokens from the bucket and forward the packet. On the other hand, if fewer than n tokens are available in the bucket, the system may consider the packet as non-conformant and store the packet in a buffer (or discard the packet). For a non-conformant packet, the system does not remove any token from the bucket. With existing technologies, if an administrator issues a request to the switch for checking conformity of a classifier policy, the system can query the underlying switch hardware (e.g., the application-specific integrated circuit (ASIC)). As a response, the switch hardware may report the cumulative data unit counts (e.g., byte or packet counts) in one or more categories. The byte count can indicate the number of transmitted bytes associated with the classifier policy. The categories can include conformant data unit counts under the information rate, data unit counts exceeding the information rate but under a peak rate, and data unit counts exceeding the peak rate. However, the cumulative data unit counts may not provide meaningful insight regarding the conformity of the classifier policy.

Based on empirical analysis of traffic information in different network configurations, the system can use a set of rules for the burst size. One of the rules can indicate that the amount of time a burst of traffic should be allowed to use the full line rate should not be lower than five milliseconds (ms). Another rule can indicate that the size limit for a burst of traffic should not be lower than ten times the maximum transmission unit (MTU). For example, if the classifier policy is defined for Ethernet, the MTU can be 1500 bytes. Since a token bucket may allow access to the full line rate for five milliseconds for such small MTUs, sampling over a long period can be unnecessary and computationally intensive.

On the other hand, if the classifier policy is defined for Transmission Control Protocol (TCP), the MTU can be 64 kilobytes. Hence, the size limit for a burst of traffic can be substantial. Hence, the token bucket may allow the burst to take up to a few seconds. To accurately represent the conformance of a token bucket that allows such a large burst, the system may need to sample over a long period. As a result, different scenarios may require a conform rate to accommodate different sampling intervals. Depending on the burst size of a token bucket, the system may need to report conform rates over a short or long period. Consequently, the accurate reporting of the conform rate with low computational overhead can be challenging.

To solve this problem, the system can calculate and report the current traffic rate based on the cumulative data unit counts obtained from the switch hardware at a sampling interval. The cumulative data unit count can indicate the number of bytes transmitted from an interface since the initial transmission. Typically, the administrator configures the information rate and burst size for a respective token bucket associated with a meter of a classifier policy. The system can facilitate an adaptive meter performance rate sampling method by determining a sampling interval (e.g., a time difference) based on the user configuration. The system can sample the cumulative data unit counts from the switch hardware based on the sampling interval. For example, successive cumulative data unit counts can be temporally separated by the sampling interval. Consequently, the resultant performance rate can accurately reflect the current moment with a quick response time and low computational overhead. In this way, the system can provide a performance rate that can indicate a relevant and meaningful traffic rate measurement to the administrator.

During operation, when the administrator configures the information rate and burst size for a respective token bucket associated with a meter of a classifier policy, the system can determine a time interval for the token bucket based on the configured parameters. The time interval can indicate the duration of a traffic burst. In this way, the system can determine the time interval of a respective token bucket of the switch at the configuration time. As a result, when traffic starts to arrive, the switch can readily use the token buckets for metering. In some embodiments, the system can determine the time interval as (burst size/information rate) and use the time interval as the sampling interval. Since the sampling interval is determined based on the configuration of a token bucket, sampling based on the sampling interval can adapt to short or long bursts of traffic.

For example, if the administrator configures short bursts (e.g., traffic that may spike for a short period), the corresponding sampling interval can also be short. The system can then calculate the performance rate, such as a conform rate, by using the sampling interval and report the conform rate back with a low wait time. On the other hand, if the administrator configures long bursts (e.g., traffic bursts that may last for a long period), the corresponding sampling interval can accommodate the largest burst size. The system can then calculate the conform rate by using the sampling interval and report the conform rate back without incurring a long wait time. To ensure that the sampling interval remains within reasonable limits (e.g., based on empirical data), the system can maintain a low watermark (e.g., a duration of 3 milliseconds) and a high watermark (e.g., a duration of 5 seconds) for the sampling interface. If the calculated value is lower than the low watermark or higher than the high watermark, the system can select the low or high watermark value as the sampling interval, respectively.

To reduce the overhead on the computational and hardware resources of the switch, the system can query for the cumulative data unit counts a predetermined number of times separated by the sampling interval. The query can be issued to the underlying switch hardware, which in turn, can respond with the cumulative data unit counts at the query time. In some embodiments, the system may issue the query twice. The system can issue the initial query when the administrator requests the conform rate. The system can then issue the second query after the sampling interval. Based on the two cumulative data unit counts obtained from the two queries, the system can determine the conform rate as (Δbytes/sampling interval). The Δbytes can indicate the difference between the cumulative byte. Since the query is issued twice, the overhead on the computational and hardware resources of the switch can be low. Furthermore, the system does not use hardware resources when the administrator does not monitor the conform rate.

To minimize the resource utilization and wait time, the system can facilitate parallelization across multiple meters or policier of a classifier policy. If multiple meters are configured for a classifier policy, the system can obtain the time intervals of all token buckets and select a representative time interval based on a selection policy. The selection policy can indicate selection based on one or more of: the largest time interval value, the smallest time interval value, the mean time interval value, the median time interval value, and a weighted average of the time interval values. For example, if the system selects the largest time interval, the system can calculate the conform rate based on the largest time interval as the sampling interval for the group of meters in the classifier policy. If the switch is equipped with a plurality of line cards or stack members, the sampling interval is selected for all line cards or stack members based on the selection policy, thereby achieving parallelization in the switch.

In this disclosure, the term "switch" is used in a generic sense, and it can refer to any standalone or fabric switch operating in any network layer. "Switch" should not be interpreted as limiting embodiments of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting embodiments of the present invention to layer-3 networks. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

Network Architecture

FIG. 1A illustrates an exemplary network facilitating efficient meter conformance in a switch, in accordance with an embodiment of the present application. A network 100 includes switches 102, 104, and 106. Network 100 can also include an access device 108 coupled to switch 104. Access device 108 can allow a user 120 (e.g., a network administrator) to configure switch 104. In some embodiments, network 100 is a Gen-Z network, and a respective switch of network 100, such as switch 104, is a Gen-Z component. Under such a scenario, communication among the switches in network 100 is based on memory-semantic communications. A respective packet forwarded via network 100 may be referred to as a transaction, and the corresponding data unit can be a flit. In some further embodiments, network 100 can be an Ethernet, InfiniBand, or other network, and may use a corresponding communication protocol, such as Internet Protocol (IP), FibreChannel over Ethernet (FCoE), or other protocol.

A traffic management system 140 of switch 104 can use a number of classifier policies for managing traffic flow. A classifier policy can facilitate a traffic meter 110 (or traffic policier) that can manage the maximum rate of traffic flow based on a token bucket 114. Based on token bucket 114, system 140 can determine whether the traffic managed by meter 110 has conformed to the limits on bandwidth and burstiness defined by token bucket 114. System 140 can measure the traffic based on a data unit. System 140 can periodically allocate a token to token bucket 114. A token rate 116 can be the rate at which system 140 allocates token to token bucket 114 and indicate an average data rate for meter 110. Moreover, the depth or size of token bucket 114 can indicate the burstiness of traffic. User 120 can configure an information rate 126 and a burst size 126 for token bucket 114.

A time interval 122 can be associated with token bucket 114 such that information rate 126=(burst size 124/time interval 122). Time interval 122 can indicate the duration or time quantum per burst. Typically, system 140 can allocate burst size 124 (i.e., the number of tokens) tokens for every time interval 122 (i.e., a duration). If a token arrives when token bucket 114 is full, system 140 can discard the token. When a packet 132 of n data units arrives at switch 104, if at least n tokens are in token bucket 114, system 140 can remove n tokens from token bucket 114 and forward packet 132. On the other hand, if fewer than n tokens are available in token bucket 114, system 140 may consider packet 132 as non-conformant and store packet 132 in a buffer (or discard the packet). If packet 132 is non-conformant, system 132 may not remove any token from token bucket 114.

To monitor the bandwidth usage and determine how well the traffic is conforming to traffic meter 110, user 120 may issue a request 172 from access device 108 to switch 104 for checking the performance rate of traffic meter 110. Examples of the performance rate can include, but are not limited to, a conform rate, an exceed rate, and a violation rate associated with meter 110. However, due to wide variations of the rate limit parameters and sample time periods, traditional rate reporting can be inaccurate, slow to reflect changes in traffic, or have significant overhead due to constant sampling from switch hardware. To solve this problem, system 140 can determine time interval 122 based on the rate-limiting parameters, such as burst size 124 and information rate 126, associated with traffic meter 110. In some embodiments, time interval 122 can be calculated as (burst size 124/information rate 126). System 140 can then determine the performance rate, such as conform rate 174, based on a sampling interval 130 derived from time interval 122. By determining conform rate 174 based on the sampling interval, switch 104 can efficiently provide conform rate 174 to user 120. Using the sampling interval, switch 104 can also determine an exceed rate or a violation rate.

Since time interval 122 indicate the duration of a traffic burst and determined based on the configurations of token bucket 114, time interval 122 can be a representative time interval based on which conform rate 174 can be determined. Accordingly, system 140 can use time interval 122 as sampling interval 130 for determining conform rate 174. Conform rate 174 determined based on sampling interval 130 can adapt to short or long bursts of traffic. For example, if user 120 configures token bucket 114 for short bursts, where the values of burst size 124 and/or information rate 126 can be small, time interval 122 can also be short. System 140 can then calculate the conform rate by using time interval 122 as sampling interval 130 and report conform rate 174 back with a low wait time.

On the other hand, if user 120 configures long bursts, where the values of burst size 124 and/or information rate 126 can be large, sampling interval 130 can accommodate the largest burst size. However, since sampling interval 130 corresponds to time interval 122, system 140 can calculate and report conform rate 174 back without incurring a long wait time. To ensure that sampling interval 130 remains within reasonable limits, system 140 can maintain a low watermark (e.g., a duration of 3 milliseconds) and a high watermark (e.g., a duration of five seconds) for the sampling interface. If time interval 122 is lower than the low watermark or higher than the high watermark, system 140 can select the low or high watermark value as sampling interval 130, respectively.

Figure 1B:
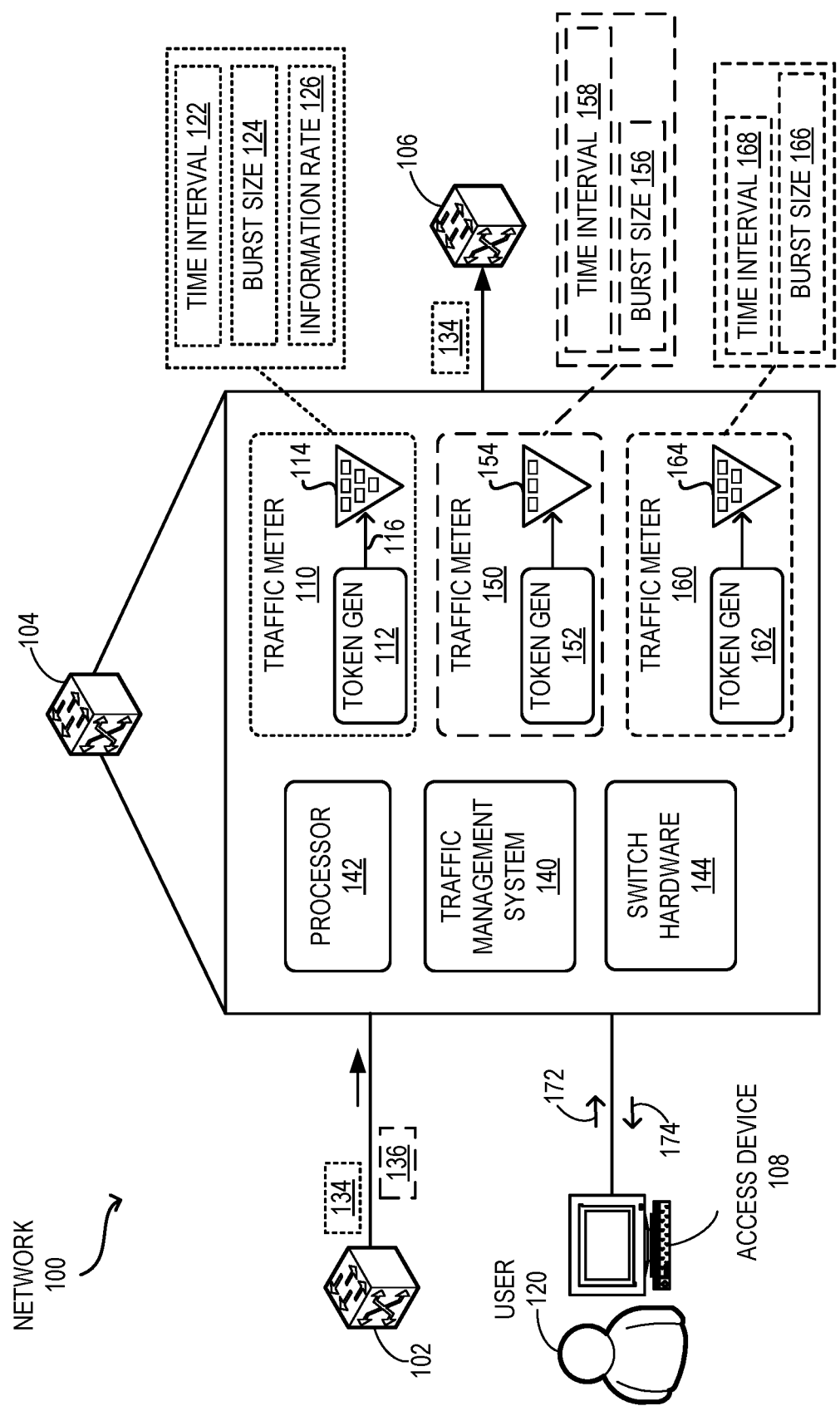
FIG. 1B illustrates an exemplary switch structure facilitating efficient meter conformance in a switch, in accordance with an embodiment of the present application.

FIG. 1B illustrates an exemplary switch structure facilitating efficient meter conformance in a switch, in accordance with an embodiment of the present application. Switch 104 can be equipped with a processor 142 (e.g., the central processing unit of switch 104) and switch hardware 144 (e.g., a set of ASIC chips facilitating packet forwarding). Switch 104 can maintain different traffic meters for different classes of traffic. For example, if a classifier policy is defined for transport layer traffic that uses TCP, system 140 can maintain a set of traffic meters 110, 150, and 160 for different types of traffic that may use TCP (e.g., voice, video, and web traffic). Traffic meters 110, 150, and 160 can maintain token generators 112, 152, and 162, respectively, that can generate tokens for tokens buckets 114, 154, and 164, respectively.

With existing technologies, if user 120 issues a request to switch 104 for checking conformity of traffic meters 110, 150, and 160, system 140 can query the underlying switch hardware 144. As a response, switch hardware 144 may report the cumulative data unit counts. However, the cumulative data unit counts may not provide meaningful insight regarding the conformity of traffic. For example, if the conform rate is calculated as the average rate based on the total data unit counts and the total elapsed time for traffic meter 110, the average rate would not reflect traffic fluctuations in network 100. On the other hand, the conform rate for traffic meter 110 can be determined as a current (or recent) traffic rate over a short period (e.g., microseconds). However, traffic rate over a short period may vary from full line rate to almost zero. Therefore, the current rate may not reflect the burstiness of traffic in network 100.

To incorporate the long-term average rate and short-term burst size, some approaches may rely on frequent sampling from switch hardware 144 and calculate a weighted (or decaying) average of the sampled data unit counts. However, such an approach can require periodic sampling via processor 142, which may lead to significant overhead on switch hardware 144 and high utilization of processor 142. Hence, depending on the burst size of a token bucket (e.g., burst size 124 of token bucket 114), system 140 may need to report conform rates over a short or long period. Alternatively, system 140 may need to frequently query switch hardware 144 via processor 142 (e.g., using an interrupt) and lead to significant overhead on processor 142 and switch hardware 144. Consequently, the accurate reporting of conform rate 174 with low computational overhead can be challenging.

To solve this problem, system 140 can calculate and report the current traffic rate based on the cumulative data unit counts obtained from switch hardware 144 based on sampling interval 174. The cumulative byte count can indicate the number of bytes metered based on traffic meters 110, 150, and 160. When user 120 configures information rate 126 and burst size 124 for token bucket 114, system 140 can determine time interval 122 for token bucket 114. System 140 may determine time interval 122 as (burst size 124/information rate 126). In the same way, system 140 can determine time intervals 158 and 168 for token buckets 154 and 164, respectively. Token generators 112, 152, and 162 can then generate burst sizes 124, 156, and 166 tokens, respectively, for time intervals 122, 158, and 168, respectively. Since system 140 can determine time intervals 122, 158, and 168 at configuration time, switch 104 can start forwarding traffic whenever the corresponding class of traffic may arrive at switch 104.

Suppose that switch 104 receives packet 134 belonging to a traffic class metered by traffic meter 110. System 140 can then determine whether a sufficient number of tokens are in token bucket 114. If the available tokens in token bucket 114 are sufficient for packet 134, system 140 can remove the tokens from token bucket 114 and forward packet 134. Switch 104 can also receive a packet 136 belonging to a traffic class metered by traffic meter 150. System 140 can then determine whether a sufficient number of tokens is in token bucket 154. If the available number of tokens in token bucket 114 is not sufficient for packet 136, system 140 may consider packet 136 as non-conformant. System 140 can then can buffer or drop packet 136 without removing the tokens from token bucket 154.

For token bucket 114, time interval 122 can indicate the duration of a traffic burst of a size corresponding to up to burst size 124. Similarly, for token buckets 154 and 164, time intervals 158 and 168 can indicate the duration of traffic bursts of sizes corresponding to up to burst sizes 156 and 166, respectively. System 140 can facilitate an adaptive meter conform rate sampling method by determining the sampling interval based on time intervals 122, 158, and 168. System 140 can sample the cumulative data unit counts from switch hardware 144 based on the sampling interval. For example, successive cumulative data unit counts obtained from switch hardware 144 can be temporally separated by the sampling interval. Consequently, conform rate 174 reported by system 140 can accurately reflect the current moment with a quick response time and low computational overhead. In this way, system 140 can provide a conform rate that can indicate a relevant and meaningful traffic rate measurement to user 120.

Figure 2A:
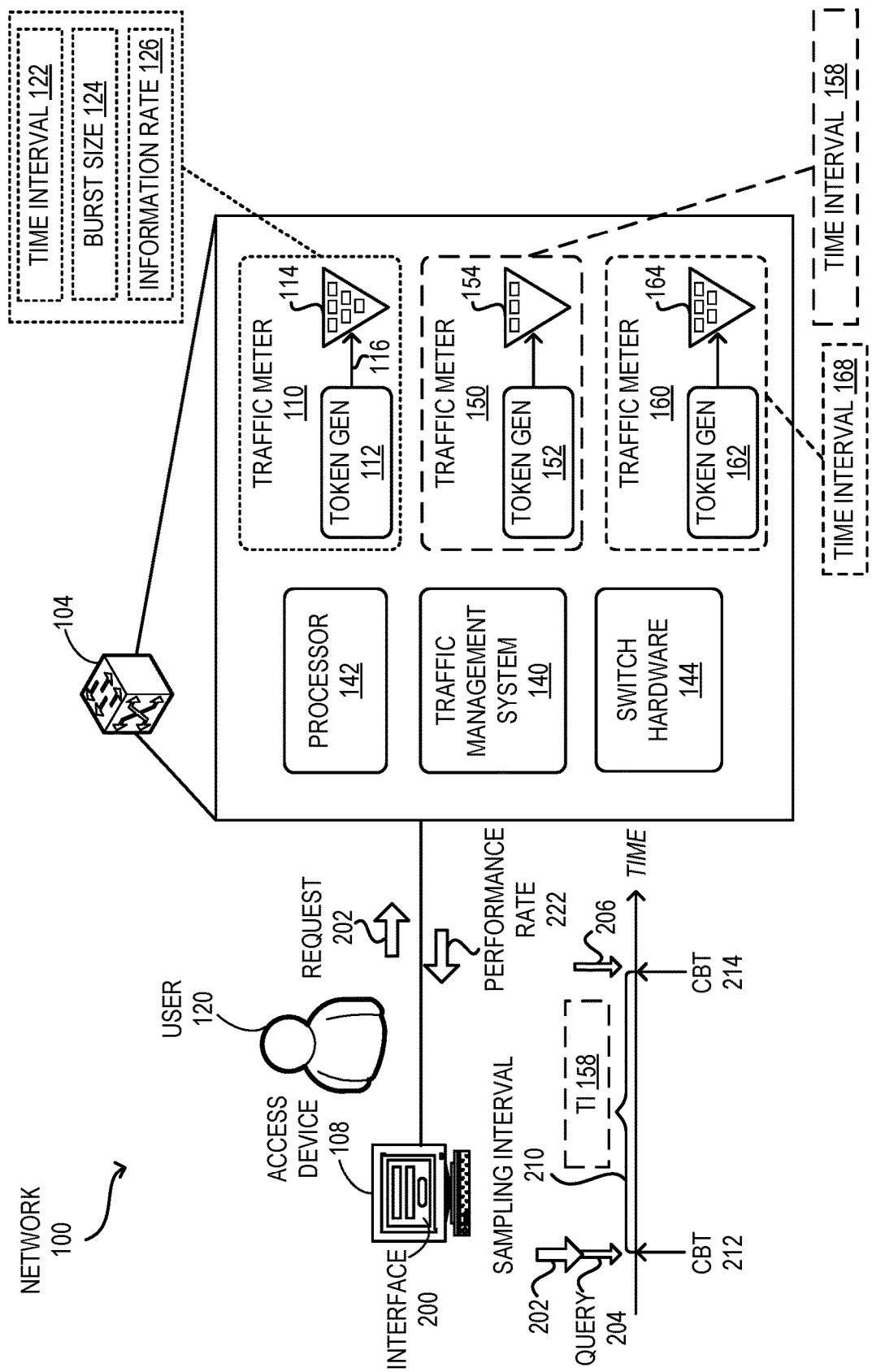
FIG. 2A illustrates an exemplary selection of a sampling interval for determining conformance with the traffic meters associated with a classifier policy in a switch, in accordance with an embodiment of the present application.

To reduce processing overhead on processor 142 and switch hardware 144 of switch 104, system 140 can query a predetermined number of times for the cumulative data unit counts separated by the sampling interval. FIG. 2A illustrates an exemplary selection of a sampling interval for determining conformance with the traffic meters associated with a classifier policy in a switch, in accordance with an embodiment of the present application. Upon determining time intervals 122, 158, and 168, system 140 can select a time interval as sampling interval 210 based on a selection policy. The selection policy can indicate selection based on one or more of: the largest time interval value, the smallest time interval value, the mean time interval value, the median time interval value, and a weighted average of the time interval values. In some embodiments, system 140 can select the largest time interval value as sampling interval 210. If time interval 158 has the largest value among time intervals 122, 158, and 168, system 140 can select time interval 158 as sampling interval 210.

During operation, user 120 can send a request 202 to switch 104 for the performance rate for the classifier policy. Typically, user 120 may issue such a request after traffic meters 110, 150, and 160 remain operational for a period. User 120 can use an user interface 200 of access device 108 to issue request 202. Examples of interface 200 can include, but are not limited to, a textual interface (e.g., a command-line interface or CLI), a graphical user interface (GUI), a virtual or augmented reality interface, a voice-command-based interface, and a gesture-based interface. Upon receiving request 202, system 140 can issue a query to switch hardware 144 for cumulative data unit counts a predetermined number of times. In some embodiments, the predetermined number of issuing the query is two.

System 140 can issue an initial query 204 when switch 104 receives request 202. Switch hardware 144 can then respond with cumulative data unit counts 212. System 140 can issue a second query 206 after a period of sampling interval 210. Switch hardware 144 can then respond with cumulative data unit counts 214. In this way, system 140 can obtain cumulative data unit counts 212 and 214 from two queries 204 and 206, respectively. System 140 can determine performance rate 222 as (Δbytes/sampling interval 210). Performance rate 222 can include one or more of: a conform rate, an exceed rate, and a violation rate. Δbytes can indicate the difference determined by (cumulative data unit counts 214–cumulative data unit counts 212). Since system 140 may issue two queries 204 and 206, the overhead on processor 142 and switch hardware 144 can be low. Furthermore, system 140 may not use processor 142 and switch hardware 144 for determining a conform rate when user 120 does not monitor the conform rate. Using sampling interval 210, system 140 can also determine an exceed rate or a violation rate (i.e., other types of performance rates).

Figure 2B:
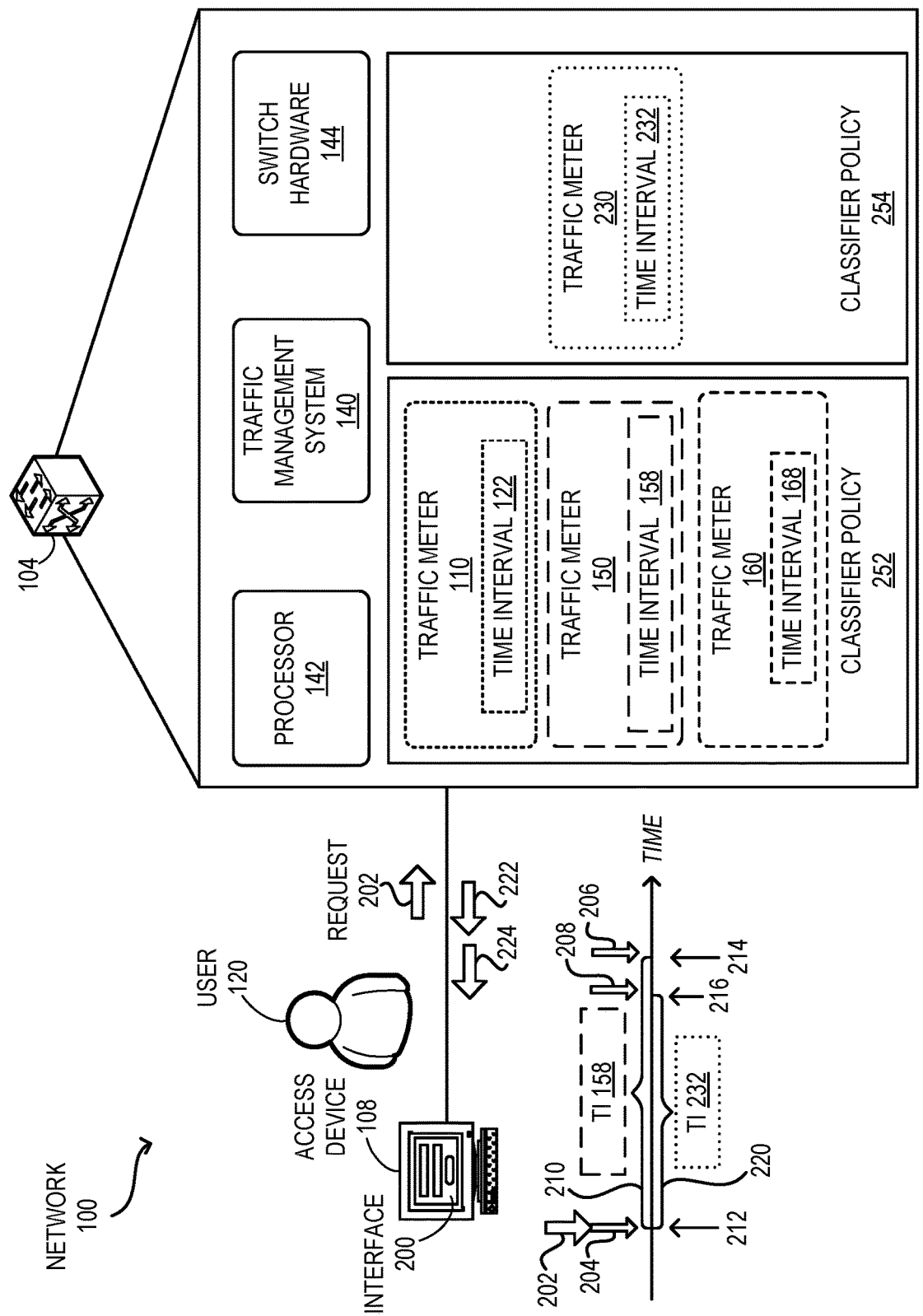
FIG. 2B illustrates an exemplary selection of time intervals for determining conformance with the traffic meters associated with different classifier policies in a switch, in accordance with an embodiment of the present application.

FIG. 2B illustrates an exemplary selection of time intervals for determining conformance with the traffic meters associated with different classifier policies in a switch, in accordance with an embodiment of the present application. To minimize the resource utilization and wait time, system 140 can facilitate parallelization across multiple meters or policiers of a classifier policy. User 120 can configure multiple classifier policies 252 and 254 for switch 104. For example, classifier policies 252 and 254 can be defined for TCP and UDP, respectively. Suppose that traffic meters 110, 150, and 160 are defined by classifier policy 252. On the other hand, a traffic meter 230 is defined by classifier policy 254. Based on the corresponding rate-limiting parameters, system 140 can determine time intervals 122, 158, and 168 for classifier policy 252, and time interval 232 for classifier policy 254.

Since multiple traffic meters 110, 150, and 160 are configured for classifier policy 252, system 140 can select a representative time interval 158 as sampling interval 210 based on a selection policy, as described in conjunction with FIG. 2A. On the other hand, since classifier policy 254 includes traffic meter 230, system 140 can select time interval 232 as sampling interval 220. Furthermore, if switch 104 is equipped with a plurality of line cards or stack members, a sampling interval is selected for all line cards or stack members based on the selection policy, thereby achieving parallelization in switch 104. System 140 can determine an individual conform rate for each of classifier policies 252 and 254. For determining each conform rate, system 140 can issue two queries to switch hardware 144. However, to reduce the overhead, system 140 can use the same initial query 204 upon receiving request 202. Switch hardware 144 can then respond with cumulative data unit counts 212.

Suppose that time interval 232 is smaller than time interval 158. Hence, sampling interval 220 can be smaller than sampling interval 210. System 140 can issue a subsequent query 208 after a period of sampling interval 220 for classifier policy 254 after a period of sampling interval 220 for determining the conform rate. Switch hardware 144 can then respond with cumulative data unit counts 216. System 140 can determine performance rate 224 based on the difference between cumulative data unit counts 216 and 212, and sampling interval 220. Performance rate 224 can include one or more of: a conform rate, an exceed rate, and a violation rate. System 140 can provide performance rate 224 to user 120 (e.g., via interface 200). Subsequently, system 140 can issue a subsequent query 206 for classifier policy 254 after a period of sampling interval 210 for determining the conform rate. System 140 can then determine performance rate 222 based on the difference between cumulative data unit counts 214 and 212, and sampling interval 210. In this way, system 140 can use cumulative byte count 212 for determining both performance rates 222 and 224. Since system 140 may issue queries 204, 206, and 208, the overhead on processor 142 and switch hardware 144 can remain low.

Figure 2C:
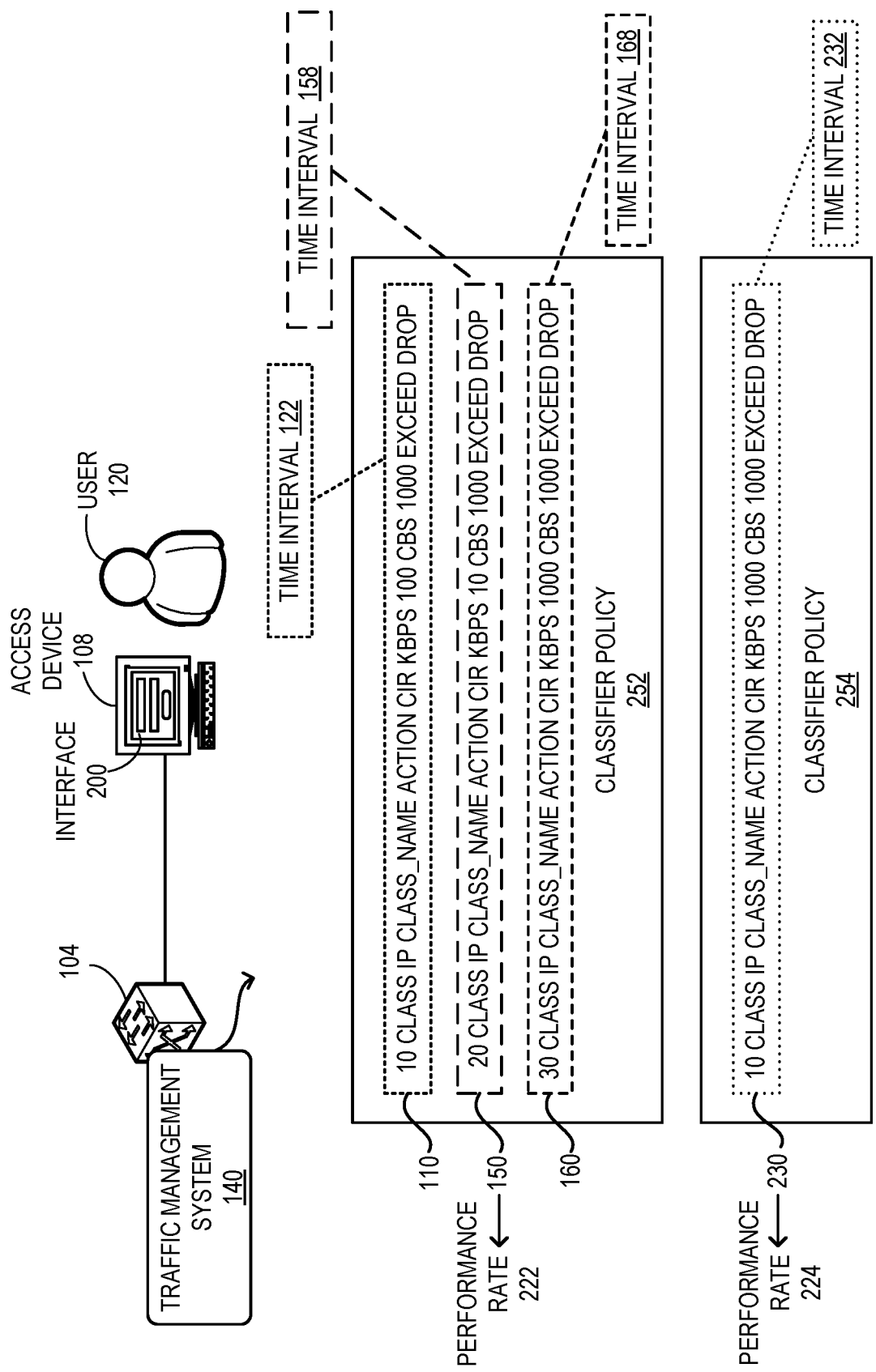
FIG. 2C illustrates exemplary configurations of traffic meters in different classifier policies in a switch, in accordance with an embodiment of the present application.

FIG. 2C illustrates exemplary configurations of traffic meters in different classifier policies in a switch, in accordance with an embodiment of the present application. User 120 can configure classifier policies 252 and 254 based on interface 200. In this example, classifier policy 252 can include traffic meters (or traffic policing filters) 110, 150, and 160; and classifier policy 254 can include traffic meter 230. Each traffic meter can be implemented as a token bucket in switch 104. In other words, system 140 can allocate respective token buckets for all four traffic meters without considering their association with a classifier policy or whether they are used in conjunction with other traffic meters.

System 140 can then determine the time interval for each token bucket. System 140 can compare the time intervals computed for the token buckets and select the largest time interval within a classifier policy to determine the conform rate. Since a time interval can be determined as burst size/information rate, system 140 can determine that traffic meter 150 (e.g., configured with burst size 1000 and information rate 10 Kbps) can have the largest time interval in classifier policy 252. Therefore, system 140 can determine performance rate 222 based on time interval 158 of traffic meter 150 in classifier policy 252. On the other hand, classifier policy 254 can have only one traffic meter 230 (e.g., configured with burst size 1000 and information rate 1000 Kbps), system 140 can consider time interval 232 of traffic meter 230 as the largest time interval in classifier policy 252. Therefore, system 140 can determine performance rate 224 based on time interval 232 of traffic meter 230 in classifier policy 252.

Figure 3A:
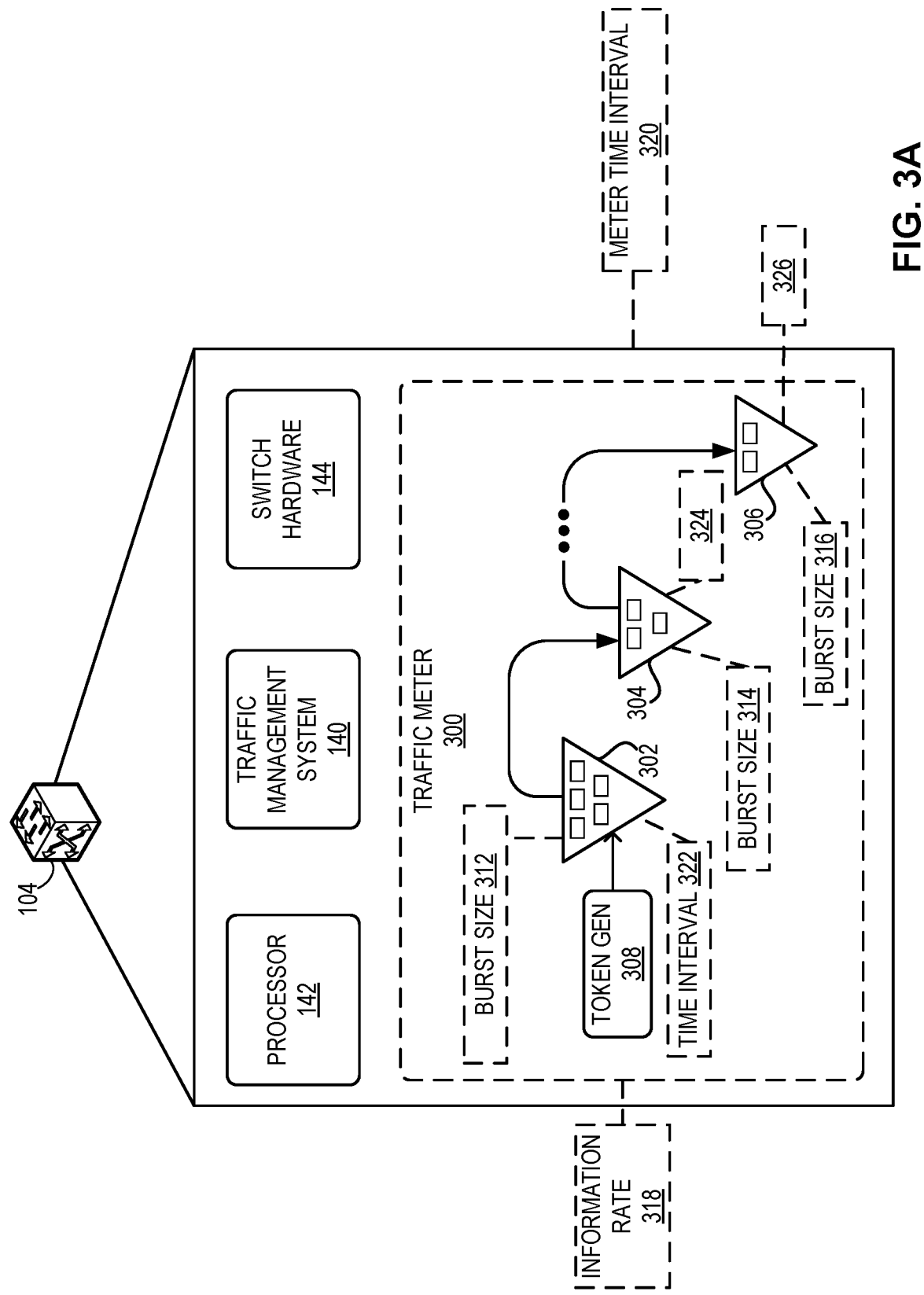
FIG. 3A illustrates an exemplary selection of a sampling interval for determining conformance with a hierarchical serial traffic meter in a switch, in accordance with an embodiment of the present application.

FIG. 3A illustrates an exemplary selection of a sampling interval for determining conformance with a hierarchical serial traffic meter in a switch, in accordance with an embodiment of the present application. Switch 104 can include a hierarchical serial traffic meter 300, which can include a number of serial token buckets 302, 304, and 306 (e.g., n serial token buckets, such as leaky buckets), which are associated with burst sizes 312, 314, and 316, respectively. Here, burst size 312 can be a committed burst size, and burst sizes 314 and 316 can be excess burst size. Token generator 318 can generate tokens for token bucket 302 based on an information rate 318. The excess tokens from token bucket 302 are allocated to token bucket 304. The allocation of excess tokens is propagated to the subsequent token buckets, such as token bucket 306. Typically, a user may configure burst sizes 312, 314, and 316, and information rate 318.

System 140 can determine time intervals 322, 324, and 326 for token buckets 302, 304, and 306, respectively, as described in conjunction with FIG. 1B. For example, time interval 322 of token bucket 302 can be calculated as (burst size 312/information rate 318). Similarly, time intervals 324 and 326 can be calculated as (burst size 314/information rate 318) and (burst size 316/information rate 318), respectively.

System 140 can then determine a meter time interval 320, which can be the representative time interval for determining the sampling interval, for meter 300. Time interval 320 can be calculated as the summation of the n time intervals associated with meter 300. In this example, time interval 320 can be calculated as the summation of time intervals 322, 324, and 326. Subsequently, system 140 can use time interval 320 for determining the performance rate, such as the conform rate, exceed rate, and/or violation rate, of meter 300.

Figure 3B:
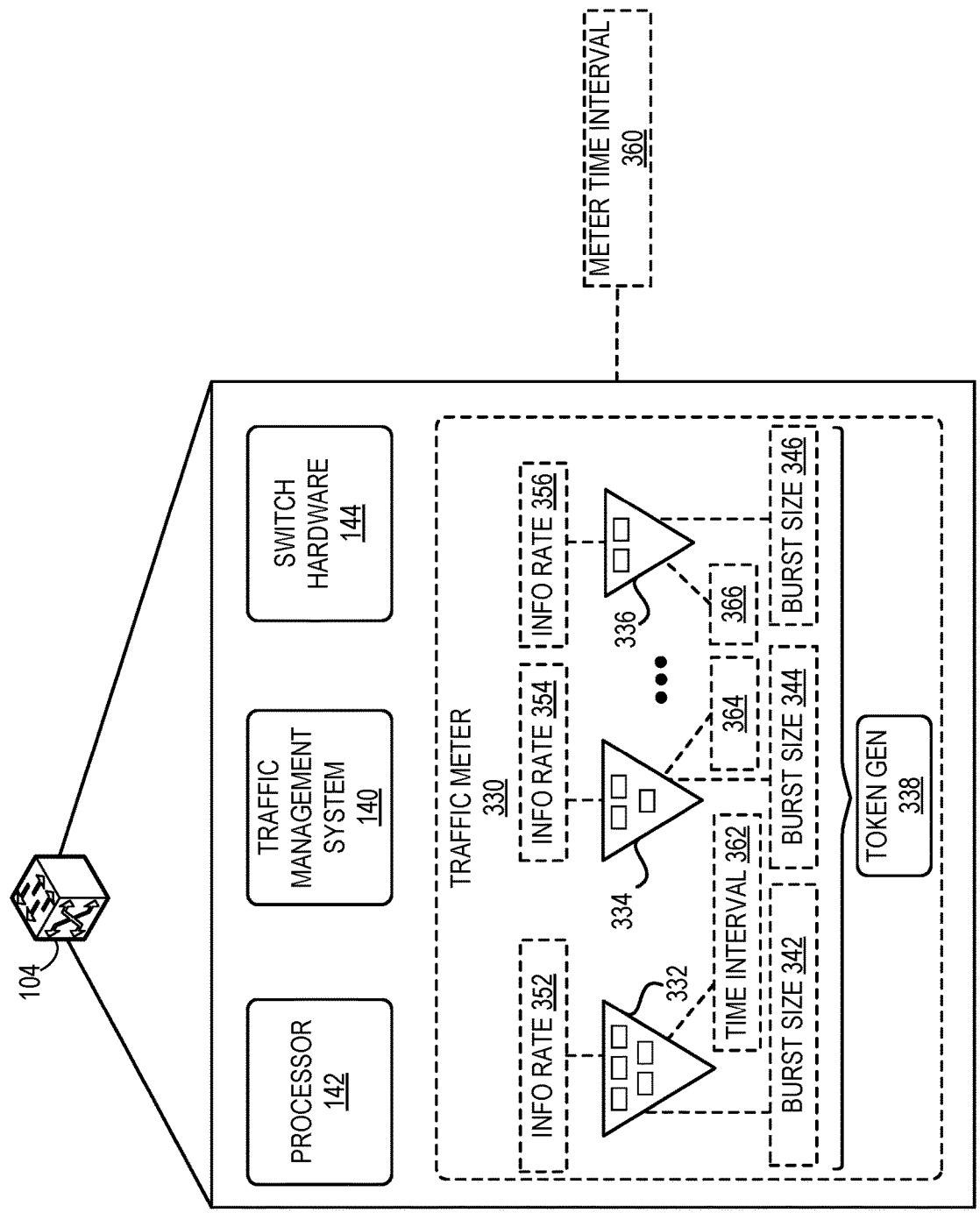
FIG. 3B illustrates an exemplary selection of a sampling interval for determining conformance with a hierarchical parallel traffic meter in a switch, in accordance with an embodiment of the present application.

FIG. 3B illustrates an exemplary selection of a sampling interval for determining conformance with a hierarchical parallel traffic meter in a switch, in accordance with an embodiment of the present application. Switch 104 can include a hierarchical parallel traffic meter 330, which can include a number of parallel token buckets 332, 334, and 336 (e.g., m parallel token buckets), which are associated with burst sizes 342, 344, and 346, respectively. Because of the parallelism, token buckets 332, 334, and 336 can be associated with information rates 352, 354, and 356, respectively. Here, burst size 342 and information rate 352 can be the committed burst size and the committed information rate, respectively. Burst sizes 344 and 346 can be the peak burst sizes, and information rates 354 and 356 can be the peak information rates. Token generator 338 can allocate tokens to token buckets 332, 334, and 336 based on their corresponding burst sizes and information rates. Typically, a user may configure the burst sizes and the information rates.

System 140 can determine time intervals 362, 364, and 366 for token buckets 332, 334, and 336, respectively, as described in conjunction with FIG. 1B. For example, time interval 362 of token bucket 332 can be calculated as (burst size 342/information rate 352). Similarly, time intervals 364 and 366 can be calculated as (burst size 344/information rate 354) and (burst size 346/information rate 356), respectively. System 140 can then determine a meter time interval 360, which can be the representative time interval for determining the sampling interval, for meter 330. Time interval 360 can be calculated as the largest of the m time intervals associated with meter 330. In this example, time interval 360 can be calculated as the largest of time intervals 362, 364, and 366. Subsequently, system 140 can use time interval 360 for determining the performance rate, such as the conform rate, exceed rate, and/or violation rate, of meter 330.

Figure 3C:
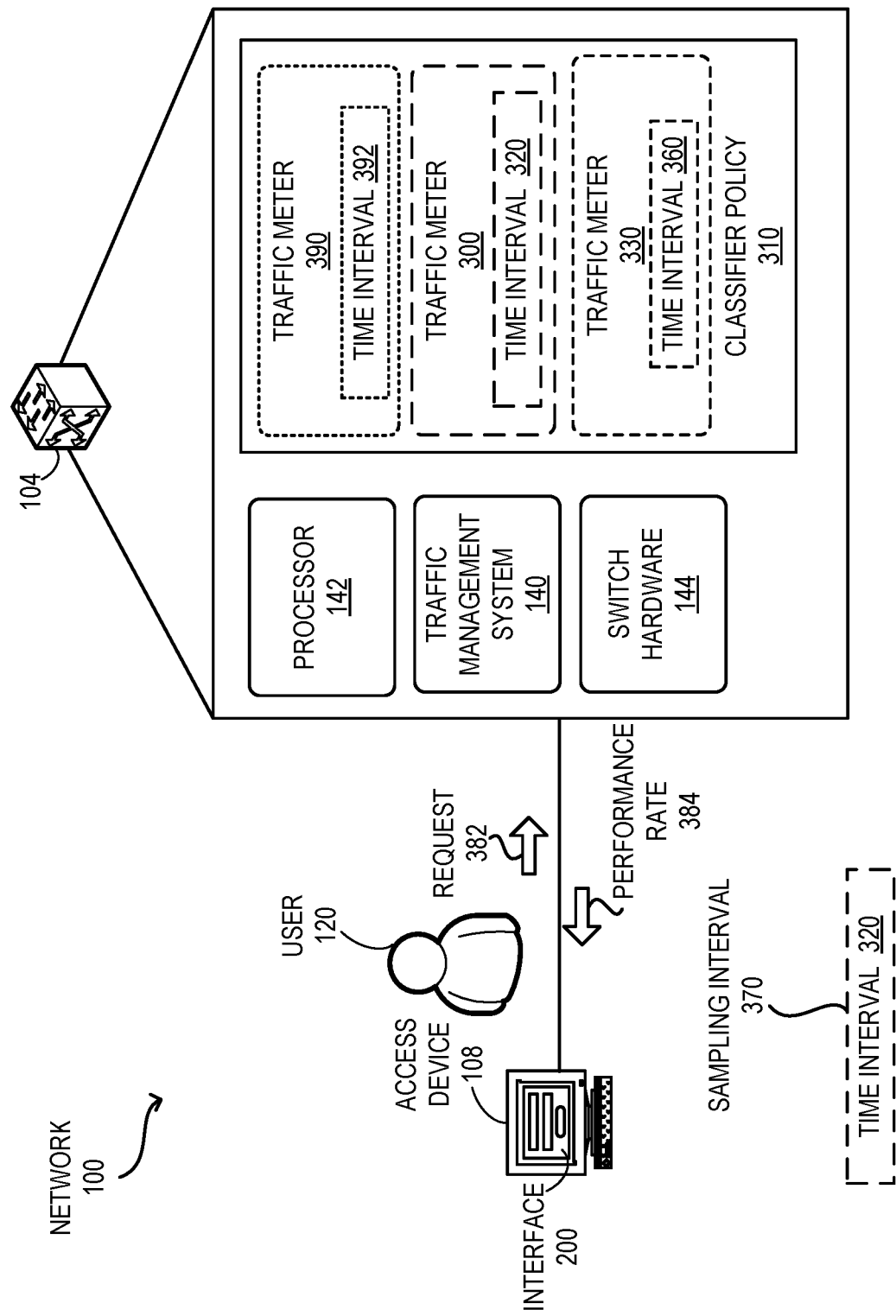
FIG. 3C illustrates an exemplary selection of a sampling interval for determining conformance with the heterogeneous traffic meters associated with a classifier policy in a switch, in accordance with an embodiment of the present application.

FIG. 3C illustrates an exemplary selection of a sampling interval for determining conformance with the heterogeneous traffic meters associated with a classifier policy in a switch, in accordance with an embodiment of the present application. In this example, user 120 can configure a heterogeneous classifier policy 310 for switch 104. Classifier policy 310 can include hierarchical serial traffic meter 300 and hierarchical parallel traffic meter 330. In addition, classifier policy 310 may also include a non-hierarchical traffic meter 390. Suppose that system 140 has determined a time interval 392 for traffic meter 390. Based on time intervals 320, 360, and 392, system 140 can select a time interval as sampling interval 370 for classifier policy 310 based on a selection policy.

The selection policy can indicate selection based on one or more of: the largest time interval value, the smallest time interval value, the mean time interval value, the median time interval value, and a weighted average of the time interval values. In some embodiments, system 140 can select the largest time interval value as sampling interval 370. If time interval 320 has the largest value among time intervals 320, 360, and 392, system 140 can select time interval 320 as sampling interval 370. Upon receiving a request 382 for a performance rate for classifier policy 310, system 140 can obtain cumulative data unit counts from switch 144 based on sampling interval 370. System 140 can then calculate performance rate 384 and send it to access device 108. Performance rate 384 can include one or more of: a conform rate, an exceed rate, and a violation rate. It should be noted that the cumulative data unit counts can include data unit counts associated with a respective token bucket of a respective traffic meter in classifier policy 310.

Operations

Figure 4:
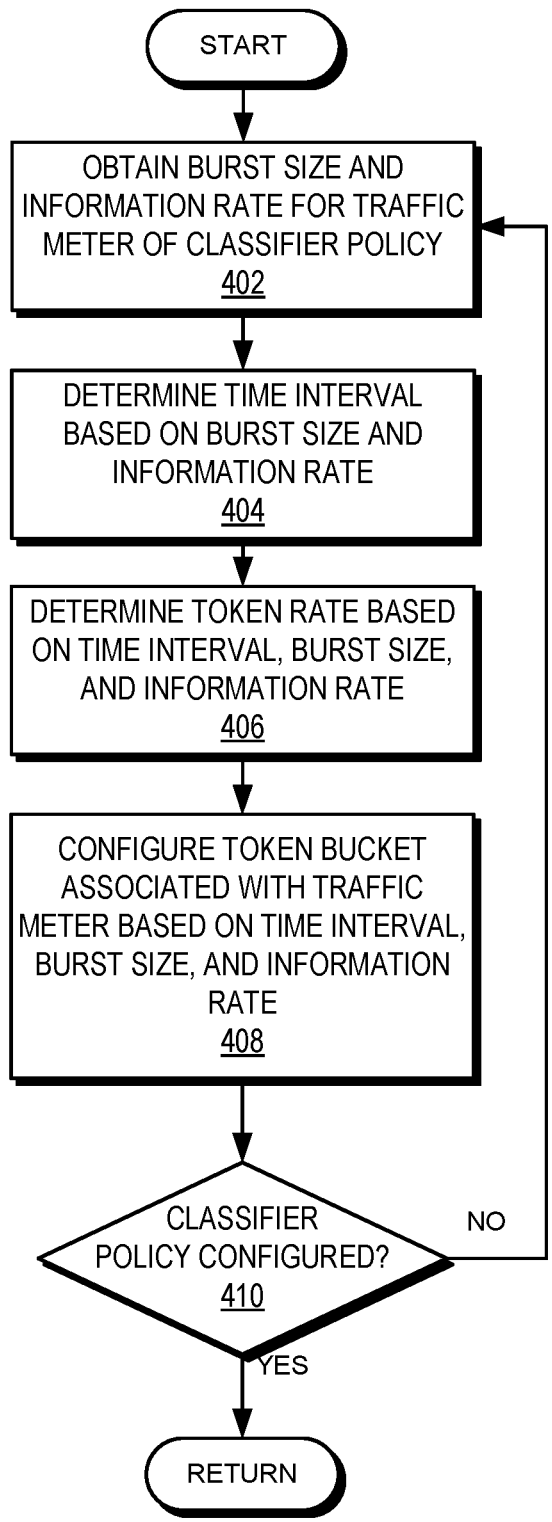
FIG. 4 presents a flowchart illustrating the process of a traffic management system of a switch determining sampling intervals for classifier policies, in accordance with an embodiment of the present application.

FIG. 4 presents a flowchart illustrating the process of a traffic management system of a switch determining sampling intervals for classifier policies, in accordance with an embodiment of the present application. During operation, the system can obtain the burst size and information rate for a traffic meter of a classifier policy (operation 402) and determine the time interval based on the burst size and information rate (operation 404). The system may also determine a token rate based on the time interval, burst size, and information rate (operation 406). For example, the token rate can indicate a token generation rate of burst size number of tokens per time interval. The system can then configure a token bucket associated with the traffic meter based on the time interval, burst size, and information rate (operation 408). The system can check whether the classifier policy is configured (i.e., the configuration is complete) (operation 410). If the classifier policy is not configured, the system can continue to obtain the burst size and information rate for a traffic meter of a classifier policy (operation 402).

Figure 5A:
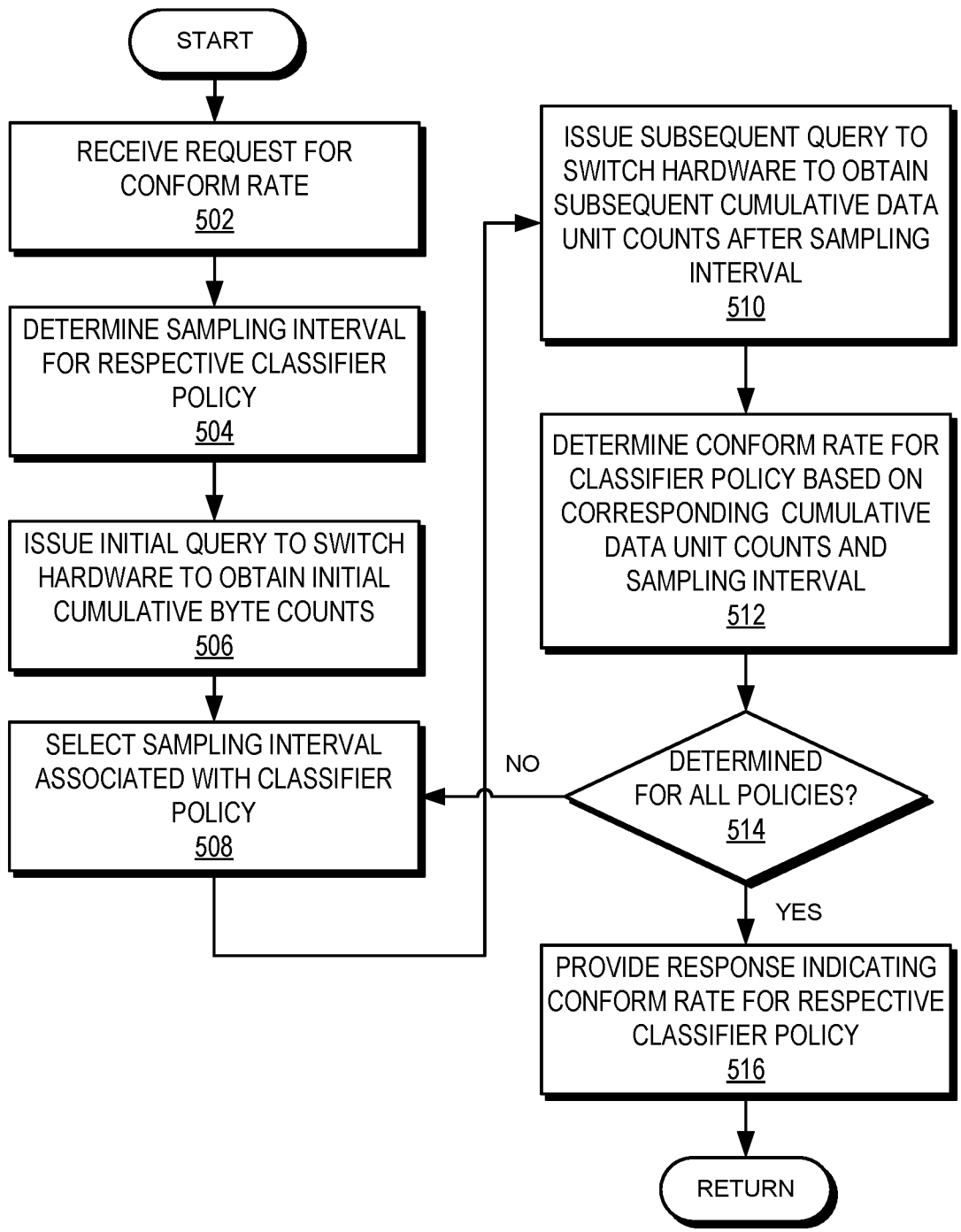
FIG. 5A presents a flowchart illustrating the process of a traffic management system of a switch facilitating conformance information for the traffic meters associated with classifier policies, in accordance with an embodiment of the present application.

FIG. 5A presents a flowchart illustrating the process of a traffic management system of a switch facilitating conformance information for the traffic meters associated with classifier policies, in accordance with an embodiment of the present application. During operation, the system can receive a request for a conform rate (operation 502) and determine a sampling interval for a respective classifier policy (operation 504). The system can then issue an initial query to the switch hardware to obtain the initial cumulative data unit counts (operation 506). The system can select a classifier policy based on the sampling interval (e.g., based on the ascending order) (operation 508). The system can then issue a subsequent query to the switch hardware to obtain the subsequent cumulative data unit counts after the sampling interval associated with the classifier policy (operation 510). It should be noted that the system can also determine other types of performance rates, such as the violation rate or exceed rate, using the sampling interval.

The system can then determine the conform rate for the classifier policy based on the corresponding cumulative data unit counts and sampling interval (operation 512). Subsequently, the system can determine whether the conform rate is determined for all classifier policies (operation 514). If the conform rate is not determined for all classifier policies, the system can continue to select the next classifier policy (operation 508). On the other hand, if the conform rate is determined for all classifier policies, the system can provide a response indicating conform rate of a respective classifier policy (operation 516).

Figure 5B:
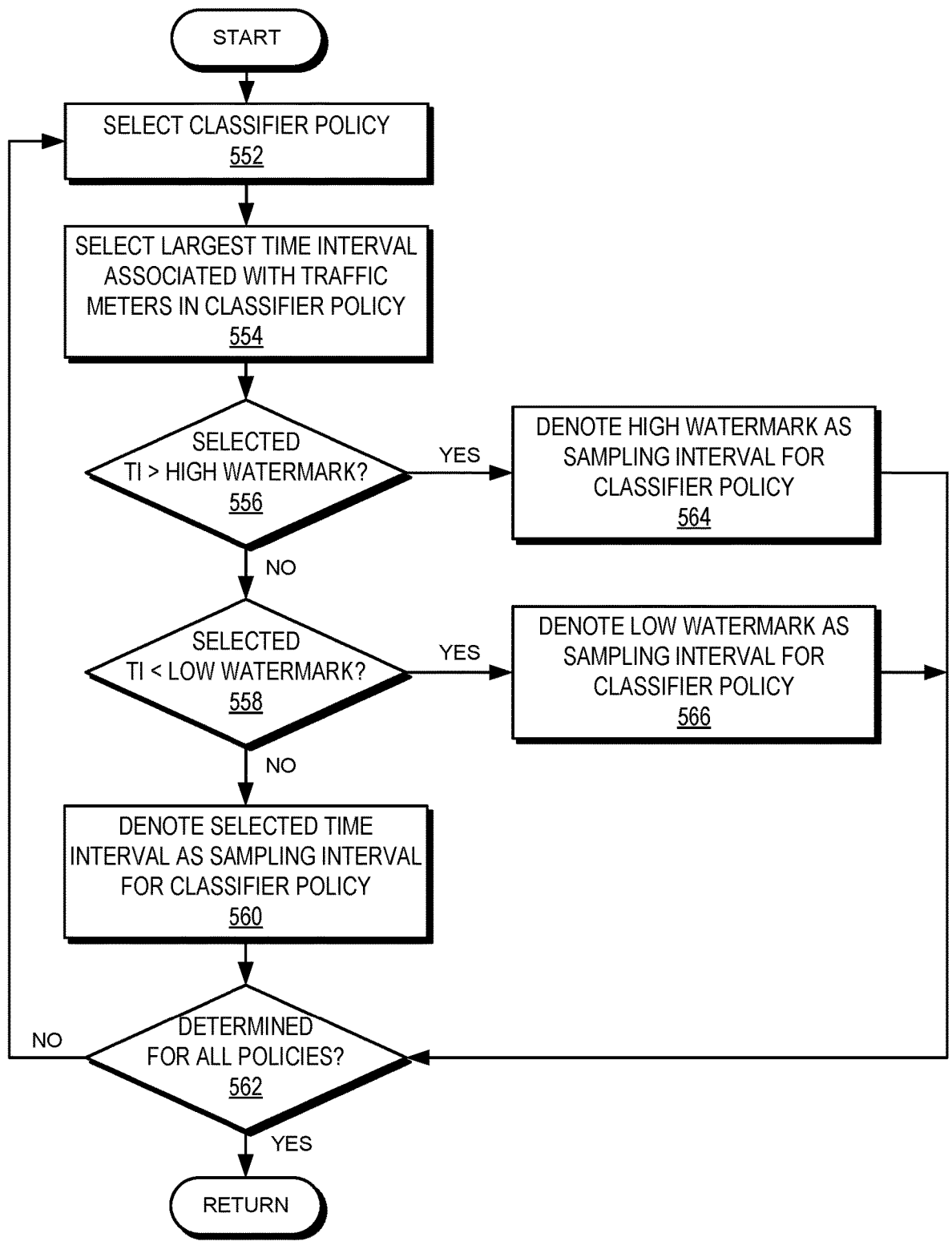
FIG. 5B presents a flowchart illustrating the process of a traffic management system of a switch determining sampling interface for determining the conformance information, in accordance with an embodiment of the present application.

FIG. 5B presents a flowchart illustrating the process of a traffic management system of a switch determining sampling interface for determining the conformance information, in accordance with an embodiment of the present application. During operation, the system can select a classifier policy (operation 552) and select the largest time interval associated with the traffic meters in the classifier policy (operation 554). The system can then determine whether the selected time interval is greater than a high watermark (operation 556). If the selected time interval is not greater than the high watermark (operation 556), the system can also determine whether the selected time interval is less than a low watermark (operation 558). If the selected time interval is not less than the low watermark (operation 556), the system can denote the selected time interval as the sampling interval for the classifier policy (operation 560).

On the other hand, if the selected time interval is greater than the high watermark, the system can denote the high watermark as the sampling interval for the classifier policy (operation 564). Similarly, if the selected time interval is less than the low watermark, the system can denote the low watermark as the sampling interval for the classifier policy (operation 566). Upon denoting the sampling interval for the classifier policy (operation 560, 564, or 566), the system can determine whether the sampling interval is determined for all classifier policies (operation 562). If the sampling interval is not determined for all classifier policies, the system can continue to select the next classifier policy (operation 552).

Exemplary Switch System

Figure 6:
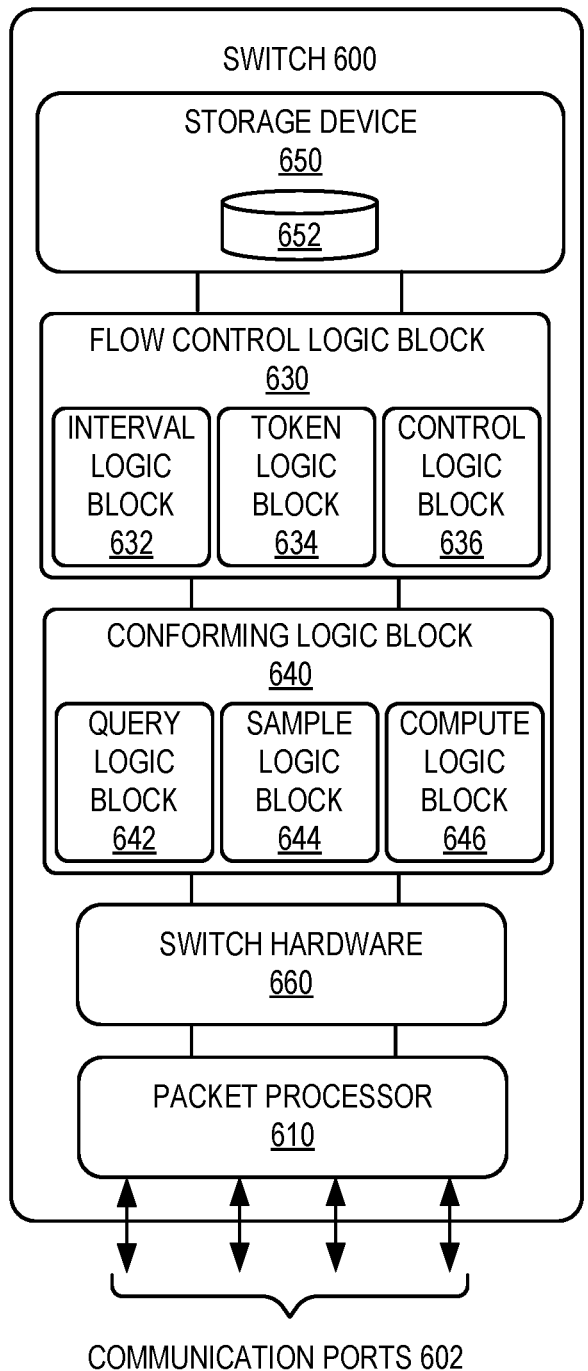
FIG. 6 illustrates an exemplary switch supporting efficient meter conformance, in accordance with an embodiment of the present application.

FIG. 6 illustrates an exemplary switch supporting efficient meter conformance, in accordance with an embodiment of the present application. In this example, a switch 600 includes a number of communication ports 602, a packet processor 610, a flow control logic block 630, a conforming logic block 640, and a storage device 650. Switch 600 can also include switch hardware 660 (e.g., processing hardware of switch 600, such as its ASIC chips), which includes information based on which switch 600 processes packets (e.g., determines output ports for packets). Packet processor 610 extracts and processes header information from the received packets. Packet processor 610 can identify a switch identifier (e.g., a media access control (MAC) address and/or an IP address) associated with switch 600 in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can maintain a database 652 (e.g., in storage device 650). Database 652 can be a relational database and may run on one or more DBMS instances. Database 652 can maintain information associated with a respective classifier policy in database 652. Flow control logic block 630 and conforming logic block 640 can facilitate the operations of system 140.

Flow control logic block 630 can include an interval logic block 632, a token logic block 634, and a control logic block 636. Interval logic block 632 can determine a respective time interval of a traffic meter of a respective classifier policy. Interval logic block 632 can also determine a sampling interval for a respective classifier policy. Token logic block 634 can generate tokens for a respective token bucket of the corresponding traffic meter based on the time interval and configured parameters of the traffic meter. Control logic block 636 can determine whether to forward a packet based on the number of available tokens in a corresponding token bucket.

Conforming logic block 640 can include a query logic block 642, a sample logic block 644, and a notify logic block 646. Query logic block 642 can query switch hardware 660 for traffic information, such as cumulative data unit counts for a classifier policy. Sample logic block 644 can determine the sampling interval for a respective classifier policy. Sample logic block 644 can also determine the time difference between queries to switch hardware 660 based on the sampling interval. Compute logic block 646 can determine the conform rate based on the sampling interval and the cumulative data unit counts obtained based on the queries. Compute logic block 646 can also provide the conform rate to an administrator.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method for facilitating data transmission in a switch, the method comprising:
    obtaining one or more sets of configuration parameters for a plurality of traffic policing filters of the switch, wherein a respective traffic policing filter corresponds to a token bucket, and wherein a number of tokens in the token bucket indicates whether to forward a packet associated with the traffic policing filter;
    determining token allocation frequencies for the plurality of traffic policing filters based on the one or more sets of configuration parameters;
    selecting a sampling interval from the token allocation frequencies based on a selection policy; and
    determining a performance rate for the plurality of traffic policing filters based on the sampling interval.

2. The method of claim 1, wherein a respective of the one or more sets of configuration parameters includes an information rate and a burst size of a token bucket.

3. The method of claim 1, wherein the performance rate includes a conform rate for the plurality of traffic policing filters, and wherein determining the conform rate further comprises:
    obtaining a plurality of traffic data points from forwarding hardware of the switch; and
    calculating the conform rate based on a difference among the plurality of traffic data points and the sampling interval.

4. The method of claim 3, further comprising:
    issuing a query to the forwarding hardware; and
    obtaining a traffic data point as a response to the query.

5. The method of claim 3, further comprising obtaining a request for the conform rate, wherein a first traffic data point is obtained at a time of the request, and wherein a second traffic data point is obtained at the sampling interval.

6. The method of claim 3, wherein a respective traffic data point is cumulative data unit counts of an interface associated with the plurality of traffic policing filters.

7. The method of claim 1, wherein the switch is configured with a plurality of classifier policies, and wherein the sampling interval is associated with a first classifier policy; and
    wherein the method further comprises selecting a second sampling interval from token allocation frequencies of one or more traffic policing filters of a second classifier policy.

8. The method of claim 1, further comprising:
    in response to determining that the sampling interval is less than a low watermark, denoting the low watermark as the sampling interval; and
    in response to determining that the sampling interval is greater than a high watermark, denoting the high watermark as the sampling interval.

9. The method of claim 1, wherein the selection policy includes selection based on one or more of: a largest token allocation frequency, a smallest token allocation frequency, a mean value of the token allocation frequencies, a median value of the token allocation frequencies, and a weighted average of the token allocation frequencies.

10. The method of claim 1, wherein the plurality of traffic policing filters includes a hierarchical serial traffic policy filter associated with a plurality of token buckets, and wherein a representative time interval of the hierarchical serial traffic policy filter for determining the sampling interval correspond to a summation of time intervals associated with the plurality of token buckets.

11. The method of claim 1, wherein the plurality of traffic policing filters includes a hierarchical parallel traffic policy filter associated with a plurality of token buckets, and wherein a representative time interval of the hierarchical serial traffic policy filter for determining the sampling interval correspond to a largest time interval associated with the plurality of token buckets.

12. A computer system, comprising:
    a processor;
    a non-transitory computer-readable storage medium storing instructions, which when executed by the processor causes the processor to perform a method for facilitating data transmission, the method comprising:
        obtaining one or more sets of configuration parameters for a plurality of traffic policing filters of the computer system, wherein a respective traffic policing filter corresponds to a token bucket, and wherein a number of tokens in the token bucket indicates whether to forward a packet associated with the traffic policing filter;

determining token allocation frequencies for the plurality of traffic policing filters based on the one or more sets of configuration parameters;

selecting a sampling interval from the token allocation frequencies based on a selection policy; and determining a performance rate for the plurality of traffic policing filters based on the sampling interval.

13. The computer system of claim 12, wherein a respective of the one or more sets of configuration parameters includes an information rate and a burst size of a token bucket.

14. The computer system of claim 12, wherein the performance rate includes a conform rate for the plurality of traffic policing filters, and wherein determining the conform rate further comprises:

obtaining a plurality of traffic data points from forwarding hardware of the computer system; and calculating the conform rate based on a difference among the plurality of traffic data points and the sampling interval.

15. The computer system of claim 14, wherein the method further comprises:

issuing a query to the forwarding hardware; and obtaining a traffic data point as a response to the query.

16. The computer system of claim 14, wherein the method further comprises obtaining a request for the conform rate, wherein a first traffic data point is obtained at a time of the request, and wherein a second traffic data point is obtained at the sampling interval.

17. The computer system of claim 14, wherein a respective traffic data point is cumulative data unit counts of an interface associated with the plurality of traffic policing filters.

18. The computer system of claim 12, wherein the computer system is configured with a plurality of classifier policies, and wherein the sampling interval is associated with a first classifier policy; and wherein the method further comprises selecting a second sampling interval from token allocation frequencies of one or more traffic policing filters of a second classifier policy.

19. The computer system of claim 12, wherein the method further comprises:

in response to determining that the sampling interval is less than a low watermark, denoting the low watermark as the sampling interval; and in response to determining that the sampling interval is greater than a high watermark, denoting the high watermark as the sampling interval.

20. The computer system of claim 12, wherein the selection policy includes selection based on one or more of: a largest token allocation frequency, a smallest token allocation frequency, a mean value of the token allocation frequencies, a median value of the token allocation frequencies, and a weighted average of the token allocation frequencies.

21. The computer system of claim 12, wherein the plurality of traffic policing filters includes a hierarchical serial traffic policy filter associated with a plurality of token buckets, and wherein a representative time interval of the hierarchical serial traffic policy filter for determining the sampling interval correspond to a summation of time intervals associated with the plurality of token buckets.

22. The computer system of claim 12, wherein the plurality of traffic policing filters includes a hierarchical parallel traffic policy filter associated with a plurality of token buckets, and wherein a representative time interval of the hierarchical serial traffic policy filter for determining the sampling interval correspond to a largest time interval associated with the plurality of token buckets.

* * * * *